(12) United States Patent
Evans (10) Patent No.: US 12,034,489 B2
(45) Date of Patent: Jul. 9, 2024

(54) SUBSEA COMMUNICATION NETWORK AND COMMUNICATION METHODOLOGY

(71) Applicant: Baker Hughes Energy Technology UK Limited, Bristol (GB)

(72) Inventor: James Evans, Nailsea (GB)

(73) Assignee: Baker Hughes Energy Technology UK Limited, Bristol (GB)

( * ) Notice: Subject to any disclaimer, the term of this patent is extended or adjusted under 35 U.S.C. 154(b) by 279 days.

(21) Appl. No.: 17/309,471

(22) PCT Filed: Nov. 27, 2019

(86) PCT No.: PCT/EP2019/025420
§ 371 (c)(1),
(2) Date: May 28, 2021

(87) PCT Pub. No.: WO2020/114624
PCT Pub. Date: Jun. 11, 2020

(65) Prior Publication Data
US 2021/0384988 A1 Dec. 9, 2021

(30) Foreign Application Priority Data

Dec. 3, 2018 (GB) .................................... 1819714
Oct. 7, 2019 (GB) .................................... 1914478

(51) Int. Cl.
| H04B 10/00 | (2013.01) |
| E21B 43/017 | (2006.01) |
| E21B 47/135 | (2012.01) |
| H04B 10/80 | (2013.01) |

(52) U.S. Cl.
CPC ........... *H04B 10/80* (2013.01); *E21B 43/017* (2013.01); *E21B 47/135* (2020.05)

(58) Field of Classification Search
CPC ........ H04B 10/80; H04B 10/40; H04B 10/03; H04B 10/032; H04B 10/035; E21B 47/135; E21B 47/017; E21B 47/12; E21B 33/0355; E21B 33/0385; E21B 33/035
USPC ........ 398/104, 105, 2, 3, 4, 5, 7, 8, 79, 171, 398/135, 136, 137, 138, 139, 33, 25; 166/341, 336, 351, 339, 344, 345, 335, 166/368
See application file for complete search history.

(56) References Cited

U.S. PATENT DOCUMENTS

| 9,303,489 B2 * | 4/2016 | Salen ................... E21B 41/0007 |
| 10,100,594 B2 * | 10/2018 | Kent ....................... E21B 47/06 |
| 2007/0053629 A1 | 3/2007 | Meyyappan et al. |

(Continued)

FOREIGN PATENT DOCUMENTS

| EP | 2039877 A2 | 3/2009 |
| EP | 2199534 | 6/2010 |

(Continued)

*Primary Examiner* — Hanh Phan
(74) *Attorney, Agent, or Firm* — Hogan Lovells US LLP (57) ABSTRACT

The present invention relates to a subsea communication network and a method of communicating between nodes in the subsea communication network. In particular, but not exclusively, the present invention relates to a subsea communication network arranged in a side A and side B topology in which the network is connected so as to provide an increased communications availability relative to conventional subsea umbilical layouts.

15 Claims, 7 Drawing Sheets

(56) References Cited

U.S. PATENT DOCUMENTS

| | | | | |
|---|---|---|---|---|
| 2007/0107903 A1* | 5/2007 | Baggs | ............... | E21B 33/0355 |
| | | | | 166/344 |
| 2012/0175122 A1* | 7/2012 | Simpson | ............. | H05K 7/1434 |
| | | | | 340/850 |
| 2016/0097906 A1 | 4/2016 | Reid et al. | | |
| 2016/0100012 A1 | 4/2016 | Haugseth et al. | | |
| 2016/0100501 A1 | 4/2016 | Fraurud et al. | | |
| 2017/0351036 A1* | 12/2017 | Coventry | ............ | G02B 6/4215 |

FOREIGN PATENT DOCUMENTS

| | | | |
|---|---|---|---|
| EP | 2357313 | A2 | 8/2011 |
| GB | 2396086 | | 6/2004 |
| GB | 2477714 | A | 8/2011 |
| GB | 2484809 | A | 4/2012 |
| GB | 2528527 | | 1/2016 |
| GB | 2537657 | | 10/2016 |
| GB | 2553505 | A | 3/2018 |
| WO | 2013/032344 | A2 | 3/2013 |
| WO | 2017/097945 | A1 | 6/2017 |
| WO | 2017/123386 | A1 | 7/2017 |

\* cited by examiner

SUBSEA COMMUNICATION NETWORK AND COMMUNICATION METHODOLOGY

CROSS-REFERENCE TO RELATED APPLICATION

As already provided in the Application Data Sheet under 37 CFR 1.76, filed May 28, 2021, this application is a National Stage application under 35 U.S. Code § 371 and so, claims the benefit of priority from PCT Application reference PCT/EP2019/025420, titled SUBSEA COMMUNICATION NETWORK AND COMMUNICATION METHODOLOGY, filed Nov. 27, 2019, which was submitted concurrently with or previous to this specification in connection with this application and which is open to public inspection with this specification, and the contents of all such papers and documents are incorporated herein by reference.

TECHNICAL FIELD

The present invention relates to a subsea communication network and a method of communicating between nodes in the subsea communication network. In particular, but not exclusively, the present invention relates to a subsea communication network arranged in a side A and side B topology in which the network is connected so as to provide an increased communications availability relative to conventional subsea umbilical layouts.

BACKGROUND

Control and monitoring of one or more subsea wells is conventionally achieved through communication between a surface node such as a surface platform or FPSO and a subsea well via an umbilical. Conventionally an umbilical carries lines for electrical power, hydraulic supply and communication between the surface node and a seabed based distribution unit (SDU). From the SDU flying leads are conventionally utilised to connect the SDU and thus the so-called topside to subsea control modules (SCMs) associated with each of the subsea wells in a subsea field.

Various subsea topology types have conventionally been suggested for interconnecting the various locations or nodes of the subsea communication network. One such connectivity strategy is a multi-drop or BUS technique. Such multi BUS connection strategies have a number of problems including cost and impact of connection failure when a connection failure occurs at certain locations between nodes. Redundant star or ring technologies conventionally offer further alternatives but at an increased cost.

Conventionally subsea networks have been proposed based on a two-sided topology. In the art these sides have been termed side A and side B. The two-sided nature of the interconnections in the network provides inbuilt redundancy in terms of components used and connections interconnecting the components. For example, conventionally each SCM for each well includes a side A subsea electronics module (SEM) and a side B SEM. In the case of a fault developing with an allocated primary SEM associated with one particular side, communication can fall back on to the remaining SEM, in an SCM, allocated to the remaining side in the two-sided topology. As a result production can continue. Conventionally each SEM in the two sides has been supplied with power and communication separately via respective sided topside power and communication controllers. A traditional Communication and Power (CAPS) technique for providing communication and power uses four wires, or separate wired links to provide power and communication between nodes.

Conventionally in an attempt to reduce a number of connecting wires carried in an umbilical or flying lead communication signals have been carried over power cables using a so-called Communication On Power (COPS) connection. This is particularly possible when communication is across copper connections. A production control system using conventional COPS topologies has a respective power link from topside to each A-side SEM in each SCM. Likewise, a surface modem unit (SMU) for side A and an electrical power coupling module (EPCM) is utilised for side A which superimposes onto, and decodes signalling from, the power supply to the side A SEMs. Conventional COPS topology likewise has a side B SMU and side B EPCM which are connected to each side B SEM of each SCM in the subsea network. Whilst providing redundancy in the case of a hardware component failure or communication link failure on either side, by providing an effectively redundant side, such two-sided topology solutions interconnected using conventional techniques can suffer from certain disadvantages. For example, a maximum throughput for all nodes is governed by an entire off set distance of a communication BUS. Likewise, in certain circumstances time division multiplexing must be used whereby only one node can talk at any one time. This can reduce possible information throughput. Also in certain circumstances certain prior art systems suffer from the problem that if a single modem fails "closed circuit" or a node fails in a certain way then the other nodes in the network cannot exchange data with a master and hence the entire multidrop Bus is lost.

SUMMARY

It is an aim of the present invention to at least partly mitigate the above-mentioned problems, while not significantly increasing the cost of the required umbilical and connection infrastructure needed as would be the case with a redundant star system.

It is an aim of certain embodiments of the present invention to provide a subsea communication network and method of communication in such a network which enables communication between a topside node and a desired subsea node even if one or more communication links or hardware components in the provided network fail.

It is an aim of certain embodiments of the present invention to utilise an internal cross strap connection between SEMs in any SCM to provide a ladder topology for communications subsea.

It is an aim of certain embodiments of the present invention to provide a subsea communication network that can determine instances of a route failure and recover from that failure.

BRIEF DESCRIPTION OF THE DRAWINGS

Certain embodiments of the present invention will now be described hereinafter, by way of example only, with reference to the accompanying drawings in which.

In the drawings like reference numerals refer to like parts.

DETAILED DESCRIPTION

According to a first aspect of the present invention there is provided a subsea communication network arranged in a topology having a first side (A) and a further side (B), comprising: two or more Subsea Control Modules (SCMs) each comprising a respective A side Subsea Electronics Module (SEM) connected to a further B side SEM via an internal communication link; an A side surface modem unit (SMU) and a further B side SMU; an A side surface Power Supply Module (PSM) and a further B side surface PSM each connected to each SCM; wherein at least two SEMs sharing a common side allocation in each of the first and further sides of the network are connected together via a point-to-point communication link.

Aptly at least one SEM in each of the A & B sides of the network is connected to a respective SMU sharing a common side allocation via a point-to-point communication link and to a further SEM in the common side allocation via a point-to-point communication link.

Aptly at least two SEMs in at least one of the first and further sides of the network is each connected to a respective SMU that shares a common side allocation, via a point-to-point communication link, and to a further SEM in the common side allocation via a point-to-point communication link.

Aptly at least two SEMs in both the first and further sides of the network are each connected to a respective SMU that shares a common side allocation, via a point-to-point communication link, and to a further SEM in the common side allocation via a point-to-point communication link.

Aptly said internal communication link comprises a 10 Mbps to 100 Mbps point-to-point communication link.

Aptly the internal communication link is a point-to-point communication link within an SCM.

Aptly the point-to-point communication link is a point-to-point communication link external to an SCM.

According to a second aspect of the present invention there is provided a Subsea Control Module (SCM) for a subsea communication network arranged in a topology having a first side (A) and a further side (B), comprising: a rigid housing; in the housing, a first Subsea Electronics Module (SEM) connected to a further SEM via an internal communication link; and a plurality of wet mate connector members supported on the housing; wherein each wet mate connector member comprises two connector elements for a respective first positive line and first negative line of a first point-to-point communication link, two connector elements for a respective further positive line and further negative line of a further point-to-point communication link, a positive power connecter element for a positive power supply connection and a negative power connection element for a negative power supply connection.

Aptly each SEM in the SCM is allocated to a respective first or further side of a communication network topology having a first and further side and is connectable via a point-to-point communication link to an SEM, in another SCM, sharing a common side allocation.

Aptly each SEM in the SCM is allocated to an A or B side of a communication network topology having a first and further side and is connectable via a point-to-point communication link to an SEM, in another SCM, sharing a common side allocation.

Aptly each SEM comprises a plurality of long haul modem elements each having a reach capability in excess of 1 km.

Aptly said internal communication link comprises a point-to-point communication link with transmit and receive capability.

According to a third aspect of the present invention there is provided a Subsea Distribution Unit (SDU) for a subsea communication network, comprising: a rigid housing; a plurality of wet mate connector members, supported on the rigid housing, that each comprise two connector elements for a respective first positive line and first negative line of a first point-to-point communication link, two connector elements for a respective further positive line and further negative line of a further point-to-point communication link, a positive power connector element for a positive power supply connection and a negative power connector element for a negative power supply connection; and an SDU interface comprising at least one wet mate interface connection.

Aptly the wet mate interface connection comprises: an A side positive power connector element; an A side negative power connector element; a B side positive power connector element; a B side negative power connector element; two connector elements for a respective first side positive line and first side negative line of a respective communication link; and two connector elements for a respective further side positive line and further side negative line of a respective communication link.

Aptly the wet mate interface connection comprises: an A side positive power connector element; an A side negative power connector element; a B side positive power connector element; a B side negative power connector element; two connector elements for a respective A side positive line and A side negative line of a respective communication link; and two connector elements for a respective B side positive line and B side negative line of a respective communication link.

Aptly a further two connector elements for a respective further first side positive line and further first side negative line of a further point-to-point communication link and/or a still further two connector elements for a respective further side positive line and further side negative line of a still further communication link.

Aptly a further two connector elements for a respective further A side positive line and further A side negative line of a further point-to-point communication link and/or a still further two connector elements for a respective further side positive line and further side negative line of a still further communication link.

Aptly two of the wet mate connector members are each connected to a respective remaining wet mate connector member of the SDU via a point-to-point communication link and to the SDU interface via a point-to-point communication link.

Aptly each wet mate connector member comprises a 6-way connector comprising 6 pins or 6 sockets.

Aptly at least one parking connector member comprising pass through connection elements, that is connectable to a wet mate connector member of the SDU, to carry through a single communication link on two respective wires.

According to a fourth aspect of the present invention there is provided a method of communicating between nodes in a subsea communication network that has a side A and side B BUS topology, comprising the steps of: when a fault occurs on any faulty Surface Modem Unit (SMU) and/or on a faulty communication link of a given side, communicating via an opposing side via an internal cross strap communication link between SEMs within an SCM back to a surface SMU.

Aptly the method further comprises communicating between an SEM and an SMU via at least one point-to-point communication link connecting SEMs, sharing in common the opposing side, in different SCMs of the communication network.

Aptly the method further comprises communicating between an SEM and an SMU via a single umbilical cable that provides power to side A SEMs in the communication network, power to side B SEMs in the communication network, at least one side A DSL point-to-point link between a side A SEM and a side A SMU and at least one side B point-to-point link between a side B SEM and a side B SMU.

According to a fifth aspect of the present invention there is provided a subsea well installation comprising an SCM according to the second aspect of the present invention and/or an SDU according to the third aspect of the present invention.

According to a sixth aspect of the present invention there is provided a subsea communication network arranged in a topology having a first side (A) and a further side (B), comprising: a plurality of Subsea Control Modules (SCMs) each comprising a respective A side Subsea Electronics Module (SEM) connected to a further B side SEM via an internal communication link; an A side surface modem unit (SMU) and a further B side SMU; a B side surface Power Supply Module (PSM) and a further B side surface PSM each connected to each SCM; wherein at least two SEMs sharing a common A or B side allocation are connected together via a point-to-point communication link.

Aptly at least one SEM in each of the A and B sides of the network is connected to a respective SMU sharing a common side allocation via a point-to-point communication link and to a further SEM in the common side allocation via a point-to-point communication link.

Aptly at least two SEMs in the A or B sides of the network is each connected to a respective SMU that shares a common side allocation (A or B), via a point-to-point communication link, and to a further SEM in the common side allocation via a point-to-point communication link.

Aptly at least two SEMs in both the A & B sides of the network are each connected to a respective SMU that shares a common side allocation, via a point-to-point communication link, and to a further SEM in the common side allocation via a point-to-point communication link. This layout effectively forms a ladder topology with 2 SMU's and at least 2 SCM's communicating via point to point communication links.

Aptly said internal communication link comprises a 10 Mbps to 100 Mbps point-to-point communication link.

According to a seventh aspect of the present invention there is provided a method of communicating between nodes in a subsea communication network that has a Side A and Side B BUS topology, comprising the steps of: when a fault occurs on a faulty Surface Modem Unit (SMU) of a given side allocation and/or when a fault occurs on a faulty communication link of the given side allocation, communicating between an SEM having the given side allocation and an SMU having a remaining side allocation, from the possible side A or side B side allocations, via an internal cross strap communication link between said an SEM and a further SEM having the remaining side allocation in an SCM in which said an SEM is housed.

Aptly communicating between said an SEM and said an SMU via at least one point-to-point communication link connecting SEMs, sharing in common the remaining side allocation, in different SCMs of the communication network.

Aptly communicating between said an SEM and said an SMU via a single umbilical cable that provides power to side A SEMs in the communication network, power to side B SEMs in the communication network, at least one side A DSL point-to-point link between a side A SEM and a side A SMU and at least one side B point-to-point link between a side B SEM and a side B SMU.

According to an eighth aspect of the present invention there is provided a method of communicating between nodes in a subsea communication network that has a side A and side B BUS topology, comprising the steps of: when a fault occurs on any faulty Surface Modem Unit (SMU) or on a faulty communication link subsea of a given side, communicating via the opposing side is possible, via an internal cross strap communication link between SEMs within an SCM back to the surface SMU.

Aptly the method further comprises communicating between said SEM and said SMU via at least one point-to-point communication link connecting SEMs, sharing in common the remaining side allocation, in different SCMs of the communication network.

Aptly the method further comprises communicating between said SEM and said SMU via a single umbilical cable that provides power to side A SEMs in the communication network, power to side B SEMs in the communication network, at least one side A DSL point-to-point link between a side A SEM and a side A SMU and at least one side B point-to-point link between a side B SEM and a side B SMU.

Certain embodiments of the present invention provide a multi sided subsea communication network and method of communicating between nodes in the subsea communication network whereby failure in a routing element on a first side or further side of the communication network can be accommodated by routing via at least one alternative pathway.

Certain embodiments of the present invention provide a subsea communication network having a two-sided (side A and side B) topology in which at least two SEMs sharing a common side allocation in each of the two sides of the network are connected together via a point-to-point communication link to thereby provide flexibility for routing in the event of a communication path failure somewhere in the network.

Certain embodiments of the present invention provide a subsea distribution unit (SDU) for a subsea communication network that includes wet mate connector members on a rigid housing that makes interconnection between an umbilical connected to a surface node and a plurality of SCMs subsea possible whilst providing improved levels of redundancy and thus recovery, when a fault occurs, relative to conventional techniques.

Certain embodiments of the present invention use a dual point-to-point copper or fibre-based modem in a subsea physical BUS layout for a production control system.

Certain embodiments of the present invention utilise an internal cross-strap in an SCM to provide a ladder topology for communications subsea with increased communications availability relative to conventional techniques.

Certain embodiments of the present invention provide a subsea communication network with a ladder topology using point to point modems.

Figure 1:
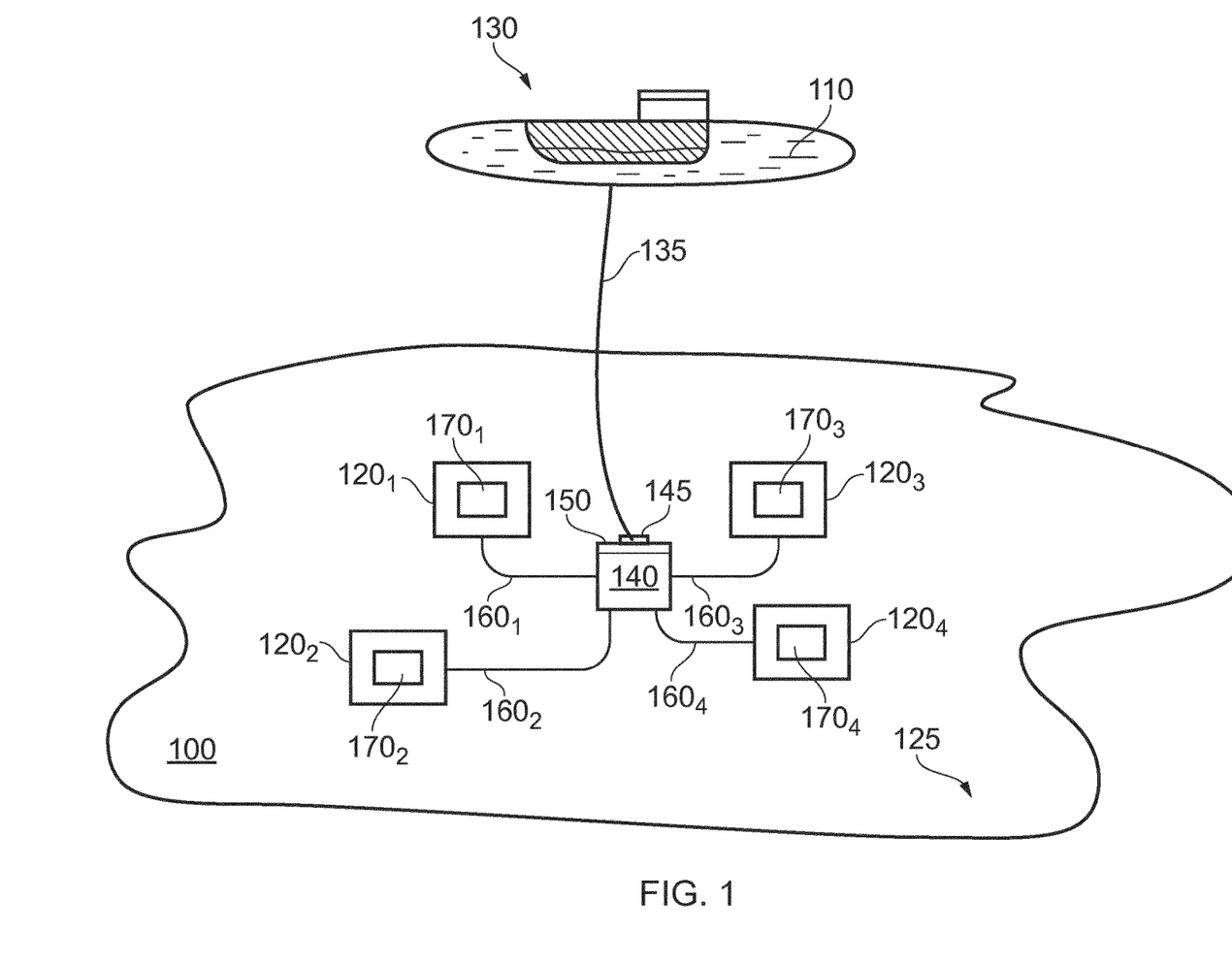
FIG. 1 illustrates a subsea location and a surface location.

FIG. 1 illustrates a subsea field 100 below a sea surface 110 where multiple installation wells $120_{1-4}$ (four shown) are distributed about a seabed 125. FIG. 1 thus illustrates a multiple well complex. A floating production storage and offloading (FPSO) vessel 130 is located above the field 100 and is connected via an umbilical 135 to a subsea distribution unit (SDU) 140. The umbilical 135 is terminated in a wet mating connector 145 which mates with a corresponding wet mating connector interface 150 of the SDU 140. Respective flying leads $160_{1-4}$ connect the SDU 140 to each respective subsea well 120.

Each subsea well 120 is associated with a respective subsea control module (SCM) $170_{1-4}$. The SCM determines operation of hydraulic driven valves which can be opened and closed using electrical signals communicated from the FPSO 130 or other topside control centre.

The FPSO 130 includes a master control station (MCS) (not shown) used to generate and receive control communications to instruct operation of subsea components and to receive data indicative of the state of various components and sensor readings etc. It will be appreciated that whilst a floating structure is illustrated in FIG. 1 the MCS may be a shore-based control centre or a platform based node or the like.

Figure 2:
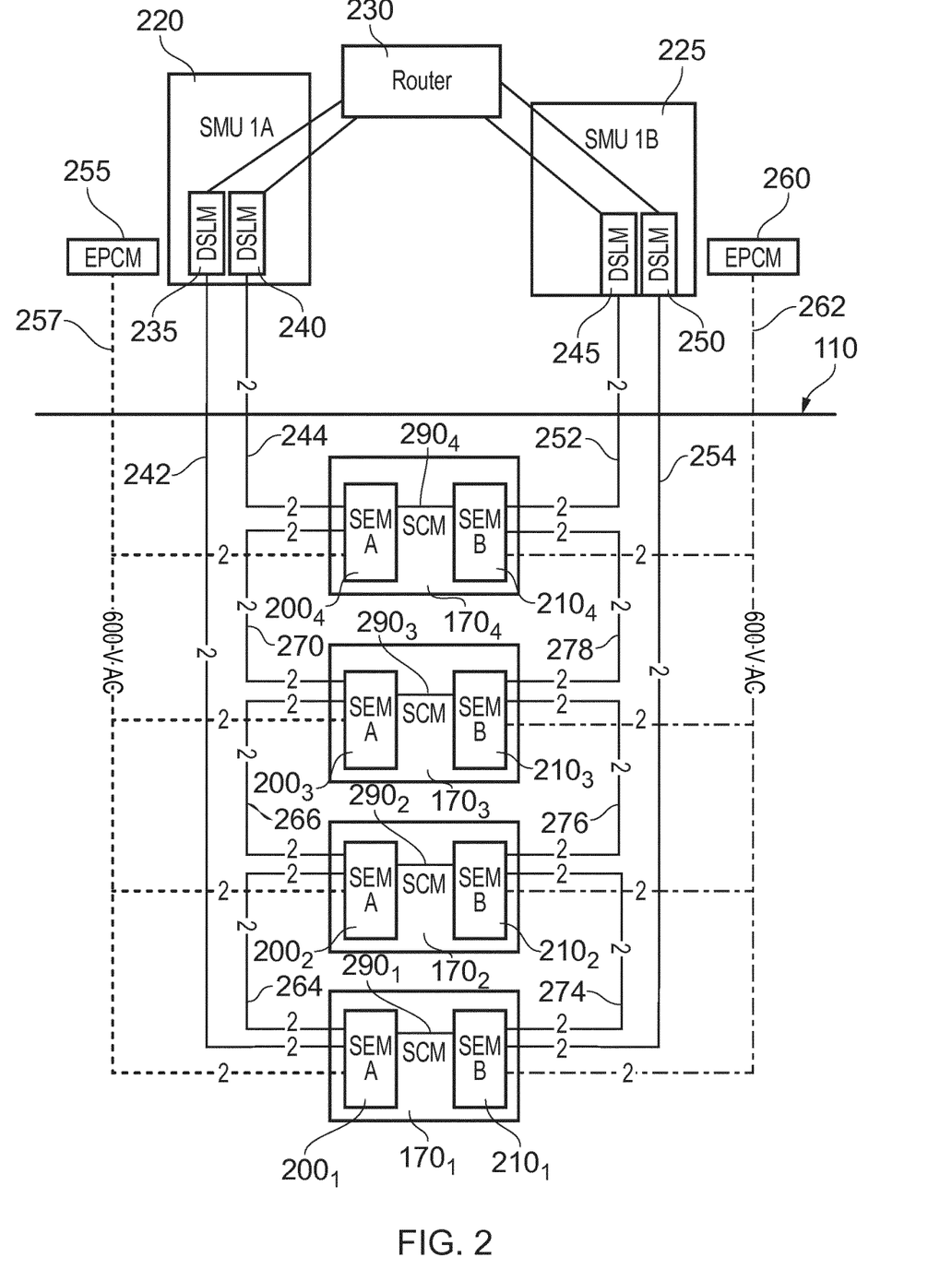
FIG. 2 illustrates a communication network having a side A and side B topology.

FIG. 2 helps illustrate the hardware components and connectivity of parts shown in FIG. 1 in more detail. In more detail FIG. 2 schematically illustrates the topside components separated from the subsea components with respect to the sea level line associated with the sea surface 110. As illustrated in FIG. 2 each SCM 170 includes a side A subsea electronics module (SEM) $200_{1-4}$ and a side B SEM $210_{1-4}$.

Each SCM is an independently retrievable unit and is used to provide well control functionality during a production phase of subsea oil and gas production. Each SCM receives electrical power, communication signals and hydraulic power supplies from surface control equipment.

FIG. 2 helps illustrate how a side A surface modem unit (SMU) 220 and a side B SMU 225 are connected to a surface based router 230. The side A SMU 220 includes a first digital subscriber line modem (DSLM) 235 and a further DSLM 240. Each DSLM 235, 240 is connected to a 5 respective communication link 242, 244. The communication link 244 shown as a point-to-point connection between the further DSLM 240 and the fourth SCM $170_4$ (shown as the upper SCM in FIG. 2) is an optional link. The further, B-side, SMU 225 includes a first DSLM 245 and a further DSLM 250. Each of the DSLMs in the side B SMU 225 is connected to a respective communication link 252, 254. A side A electrical power coupling module (EPCM) 255 provides power to each SCM via a BUS arrangement and thus to the A-side SEMs in each SCM via a power connection 257 shown as a dotted line. A side B EPCM 260 provides power to each SCM 170 and thus to the side B SEMs via a respective power connection 262 shown as a chain and dotted line.

Whilst FIG. 2 illustrates power and communication links being separated in space it will be appreciated by those skilled in the art that the side A power supply on connection 257 is provided by two wires extending along the common umbilical 135. Likewise, the power connection 262 for the side B of the network is carried by two different respective wires through the umbilical 135. The side A power supply 257 is thus provided by a positive power supply wire and a negative power supply wire each of which is terminated at a respective end by a respective positive or negative power connector element.

The first DSLM 235 in the side A SMU 220 is connected via a point-to-point communication connection 242 to the SCM $170_1$ shown at the bottom in FIG. 2. By point-to-point communication connection is meant that there is no intervening active element other than a direct wired (or optical) connection between two points. By contrast the further DSLM 240 in the A-side SMU 220 is connected via a point-to-point communication connection 244 to the SCM $170_4$ shown at the top in FIG. 2. As noted above this communication connection is an optional link. Each of the point-to-point communication links is a two wire (or fibre) point-to-point connection with a first of the pair of wires providing a first positive line and a remaining wire of the pair providing a negative line of the point-to-point communication link. It will be appreciated that whilst the four SCMs shown in FIG. 2 are illustrated in a stacked manner in the figure this is in no way to be taken as an indication that those SCMs are in practice connected higher or indeed lower from the seabed to the sea surface. Rather FIG. 2 is schematic in nature and is meant to show the interconnection of SCMs which are distributed geographically over the surface of the seabed.

Likewise, on the B-side of the network topology the first DSLM 245 in the side B SMU 225 is connected via the point-to-point link 252 to the fourth SCM $170_4$. Again, this point-to-point communication link is provided by two wires one being a positive line and the other being a negative line of the respective point-to-point communication link. The further DSLM 250 in the B-side SMU 225 links the side B SMU 225 to the first SCM $170_1$ shown at the bottom of the stack shown in FIG. 2. This is an optional link. The connection is a two wire point-to-point communication link with a first wire in the link providing a positive line and a remaining wire providing a negative line.

FIG. 2 helps illustrate how the SEM $200_1$ in the lower SCM $170_1$ (lower in terms of what is shown in FIG. 2) is connected via a point-to-point communication link 264 to the A-side SEM $200_2$ in the adjacent SMC $170_2$. Likewise, that SEM $200_2$ is connected via a point-to-point communication link 266 to the A-side SEM $200_3$ in the third SCM $170_3$ shown above the second SCM $170_2$ in FIG. 2. Likewise, that SEM $200_3$ is connected via a point-to-point communication connection 270 to the A-side SEM $200_4$ in the upper most (in terms of FIG. 2) SCM $170_4$. As noted above that SEM $200_4$ is connected to the further DSLM 240 in the Aside SMU 220 via an optional link 244.

FIG. 2 also helps illustrate how the side B SEM $210_1$ in the SCM $170_1$ shown at the bottom of FIG. 2 is connected via a point-to-point communication link 274 to the side B SEM $210_2$ in the SCM $170_2$ immediately above the lower SCM $170_1$ shown in FIG. 2. That SEM $210_2$ is likewise connected via a point-to-point communication connection 276 to a further side B SEM $210_3$ in the third SCM $170_3$. That SEM $210_3$ is likewise connected via a point-to-point communication link 278 to the SEM $210_4$ in the upper most (in terms of what is shown in FIG. 2) SCM $170_4$. That SEM $210_4$ is connected to the first DSLM 245 in the B-side SMU 225 using the connection 252 as previously described.

FIG. 2 also helps illustrate how an internal communication connection is provided within each SCM connecting together the two SEMs in that SCM. Aptly this internal interconnection can be a cross strap link. For example, as illustrated in FIG. 2 in the lower most (in terms of what is shown in FIG. 2) SCM $170_1$ the side A SEM $210_1$ is connected to the side B SEM $210_1$ via an internal communication connection $290_1$ Each pair of SEMs in each SCM is interconnected via a corresponding internal communication link $290_{1-4}$. This internal cross strap link helps provide a bridge between the two sides (the A-side and B-side) which enables rerouting of communication signals (and thus control signals or data signals) when a component or link failure occurs on one side of the two-sided topology via suitable communication connection links and hardware on a remaining side of the topology. The interconnectivity shown in FIG. 2 thus illustrates a ladder-like topology.

Figure 3:
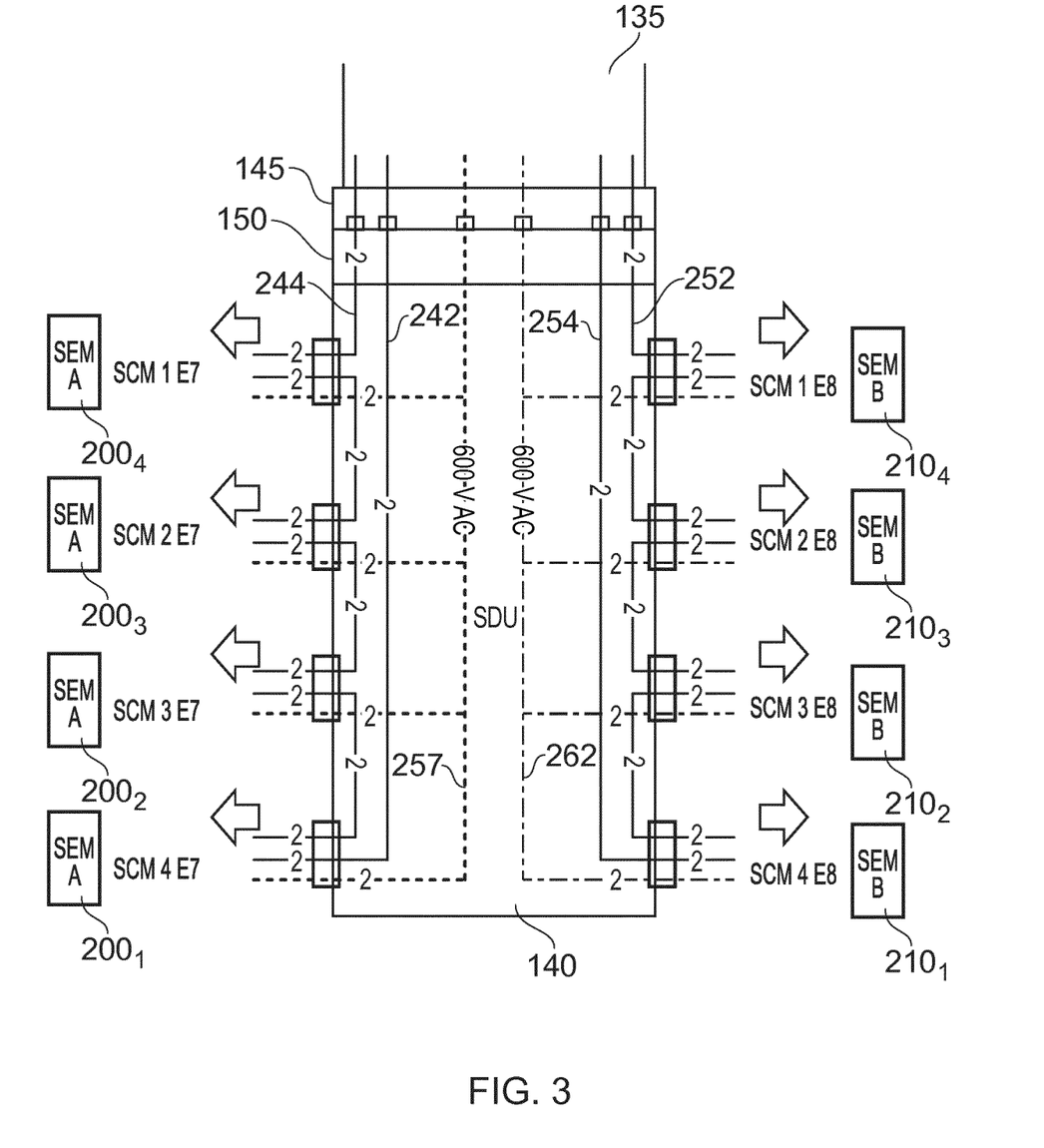
FIG. 3 schematically illustrates a subsea distribution unit and its connection to multiple flying leads and a topside umbilical.

FIG. 3 helps illustrate a schematic view of the subsea distribution unit (SDU) 140 in more detail. The SDU includes a rigid housing that supports wet mating connectors of a wet mating interface 150 which interfaces with a wet mating connector 145 of an end of the umbilical 135 that extends upwards to topside. As illustrated in FIG. 3 the umbilical 135 carries two wires which can be used to provide the communication link 244 between the further DSLM 240 in the A-side SMU 220 and the SEM $200_4$ in the fourth labelled SCM $170_4$. The umbilical 135 carries a further two wires which provide the communication link 242 interconnecting the first DSLM 235 in the A-side SMU 220 with a point-to-point communication link to the SEM $200_1$ in the lower most (in FIG. 2) SCM $170_1$ Power is also provided to each A-side SEM via a two wire power connection 257 which runs through the umbilical. Likewise, on the B-side two wires are used to provide the B-side power connection 262 which connects each B-side SEM $210_{1-4}$ with a B-side topside EPCM 260. The two wires for the A-side power connection and the two wires for the B-side power connection are carried by the umbilical 135.

The umbilical 135 also carries two wires for the point-to-point communication connection 254 between the further DSLM 250 in the B-side SMU 225 and the SEM $210_1$ in the lower most (in FIG. 2) SCM $170_1$ The umbilical 135 also carries two wires which provide the point-to-point communication link 252 between the first DSLM 245 in the B-side SMU 225 and the B-side SEM $210_4$ in the upper most (in terms of what is shown in FIG. 2) SCM $290_4$.

Thus as illustrated in FIG. 3 the umbilical need carry only twelve wires to provide the two power connections and four point-to-point communication connections. Six (6) wires are provided for the A-side and six for the B-side. More wires could of course be provided along the umbilical for redundancy purposes or for other functions. As illustrated and described with respect to FIG. 2 above, the A-side point-to-point connection 244 between the further DSL 240 in the A-side SMU 220 and the top shown A-side SEM $200_4$ is optional as is the point-to-point connection 254 between the further DSLM 250 in the B-side SMU 225 and the B-side SEM $210_1$ in the lower most (in the scheme shown in FIG. 2) SCM $170_1$. If either or both of these optional links are not to be utilised, then it will be appreciated by those skilled in the art that the corresponding wires need not be provided along the length of the umbilical 135 up to topside. Either optional link may be removed to reduce an initial umbilical offset cost. Aptly the optional links are removed to the nearest on the A-side and furthest on the B-side (or vice versa) from the topside. This helps improve availability should a link failure occur rather than a link to a common SCM on both sides. It will be appreciated that if either optional link is not utilised then each SMU can only include one modem. A mission of both optional links still provides an advantage relative to conventional techniques and suffers only a minor reduction in availability as a network ring is completed through the internal cross strap. At the software and ethernet packet level this is achieved via routing protocols as all SEM modems are routers. In each SEM there are multiple interface cards with IP addresses which a topside control system can target for messages. If an optional link is omitted communication up to topside occurs via the cross strap link according to standard routing protocols. For example, link metrics can be used to control paths chosen. Aptly the cross strap internal to an SCM is configured with an associated high metric which then forces communication to an A-side SEM via the A-side point-to-point communication link. The cross strap is thus only used if an SEM on the A-side becomes isolated. A slight increase in throughput on the B-side occurs but with an improved bandwidth of point-to-point links the rerouting of the A-side communications through the B-side has little effect on an update rate of the B-side SEMs. If a communication link fails a diagnostic tool such as an RI Pv2 heartbeat not being received over the link can be used to indicate that the link and route should die so that another path can be taken with a better metric.

FIG. 3 helps illustrate how the SDU interface 150 includes connector elements to mate and communicatively connect to corresponding connector elements on the wet mate interface connection 145 of the umbilical. As illustrated in FIG. 3 male pins for each wire in the SDU mate with mating socket elements which provide corresponding connector elements for the umbilical wet connection. It will be appreciated that the sockets and pins may be alternatively arranged or indeed other types of interconnecting elements may be used.

FIG. 3 also helps illustrate how the housing of the SDU carries further wet mate connector members to mate with corresponding connector members of flying leads which extend from the SDU to a respective SCM. Although in FIG. 3 the wet connectors are shown separately on the A-side and the B-side it will be appreciated that since connections are made on the A and B side via a common flying lead between the SDU and a respective SCM the wet mating connectors may be in common for a connection between the SDU and each respective SCM. That is to say for the embodiment illustrated in FIGS. 1, 2 and 3 which, by way of example, relates to four installation wells in a subsea field and thus four SCMs and one umbilical connecting a topside MCS to the subsea region that single umbilical 135 would be connected to one single SDU 140 which would then have four flying leads connecting the SDU 140 to each SCM. As such the rigid housing of the SDU would include an umbilical interface and four wet mate connectors for four respective flying leads each connecting a wet mating connector of the SDU to a respective SCM. It will be appreciated by those skilled in the art that if a different number of wet mate connectors and indeed respective flying leads were needed then the number of wet mating connectors and flying leads could be increased or decreased.

FIG. 3 thus helps illustrate how internal connections within the SDU connect from respective A-side and B-side power supplies to provide an A-side and B-side power supply to each SCM and how internal connections within the SDU connect wires leading to the topside to connect SEMs having a common side in the two sided topology as well as how such connections can be made between an SEM and topside. For example, as shown in FIG. 3 three internal point-to-point communication connections are provided on the A-side of the network together with one respective point-to-point connection between the lower most (in terms of what is shown in FIG. 3) SEM $200_1$ and topside via the umbilical 135 and between the top most (in terms of what is shown in FIG. 3) SEM $200_4$ and the umbilical. The B-side internal connections likewise link side B SEMs together via point-to-point communication connections as well as 5 providing point-to-point connections between two SEMs $210_1$, $210_4$ and topside.

Figure 4:
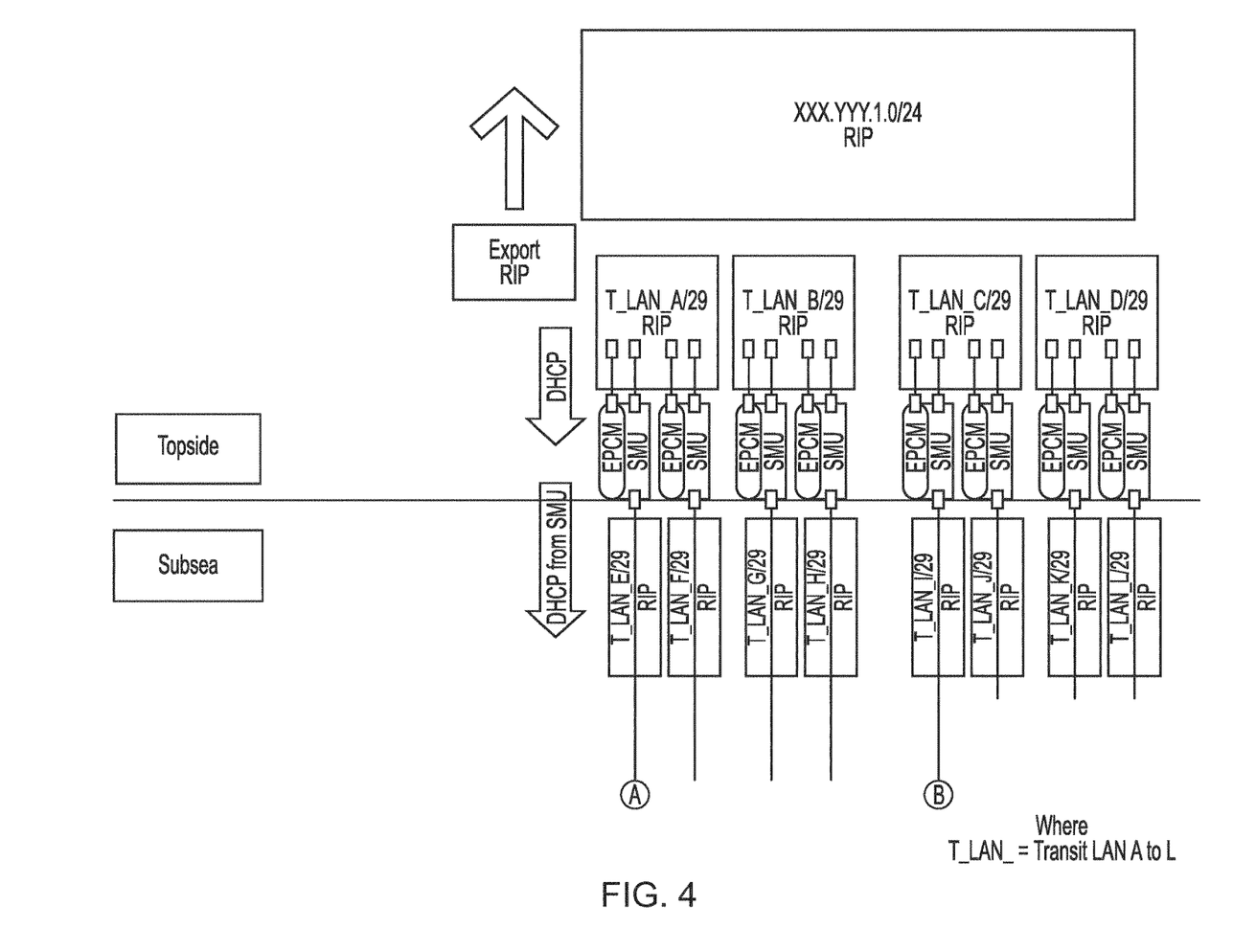
FIG. 4 illustrates routing through the network illustrated in FIG. 2.

FIG. 4 schematically illustrates how various transit networks exist between SEM local area networks (LANs) and topside LANs over the multiple external connections from an SEM. All are electrically active, independent of one another and transmit and receive data simultaneously in the case of point-to-point layer one links.

A dynamic host configuration protocol (DHCP) can be utilised. This is a network addressing protocol used on an IP network whereby a DHCP server located on a master dynamically assigns an IP address to a slave or slaves. DHCP can be utilised to exchange IP addresses automatically on these transit interfaces and establish IPv4 networks over those interfaces with the help of the routers on the modems illustrated. This enables a plug and play approach to establishing a subsea network. The use of a routing protocol such as RI Pv2 enables the modem/router within each SEM to determine a lowest hop/metric to an IP destination. When multiple routes exist to the same IP address the application running on each router determines the best one at that instant in time. RIP itself is used to determine an optimum layer 3 route, utilising messages between routers sent on layer four and an application located on each router, the management of message direction is therefore pushed higher in terms of the conventional OSI model rather than using redundancy protocols such as spanning tree or link aggregation at layer 2. Aptly applications such as RIPv2 and DHCP enable plug and play functionality of the network regardless of the restrictions of layer 2 redundancy protocols with limitations due to the physical layer 1 i.e. not all layer 1 technologies might support RSTP or link aggregation as the link speed may be low in some cases. Moving redundancy to layer 3 with route management protocols helps provide for the use of multiple and varied layer 1 media for data transmission. It will be appreciated by those skilled in the art that fixed IPs using transit interfaces and other routing protocols such as OSPF could optionally also be utilised according to certain embodiments of the present invention.

FIG. 4 illustrates routing between nodes of the network illustrated in FIG. 2. Solid lines represent external SEM to SEM connections. Dotted lines represent SEM to SEM connections within an SCM. Each SEM router/modem has at least two transit LANs connected to it (or three). Therefore, two or more routes exist. The subsea communication network thereby provides a ladder topology using point to point modems. An RIP message is sent from each subsequent router/modem at the end of these connections. Heartbeat messages and route table exchanges are not sent if any physical layer connection fails in any way and thus a connection is broken. After a reconfigurable period if no heartbeat is received on that interface the route dies in the associated local router/modem. The router/modem constantly monitors a local table built from received RIP messages and as such if it is the lowest metric route which has died then the router can redirect packets/messages to the next lowest metric route. Aptly this RIPv2 approach enables tuning of metrics so interfaces can be predetermined as preferred choices. I.e. a primary communication path may have a metric of 1 and a cross strap connection a metric of 3 forcing messages through the primary interface first and cross strap as a last resort. It will be appreciated that other methods of link redundancy may be achieved such as OSFP depending upon what is supported by any particular physical layer modem technology. The modems throughout the network are layer three routers and thus can determine a best return path via metrics and hops to their destination. This can be determined using RIPv2.

Dual point-to-point modems are provided in each SEM. With an optional 10/100 Mbps cross strap link, providing at least two routes out from each router typically each modem in each SEM has two long haul modems which thus have a reach capability of greater than 1 km, with an optional cross strap link between SEM A and B within an SCM. The two modems in each A-side SEM and the two modems in each B-side SEM communicate using a common routing protocol. Routing protocol may also be communicated to every other SEM modems on the network.

Figure 5:
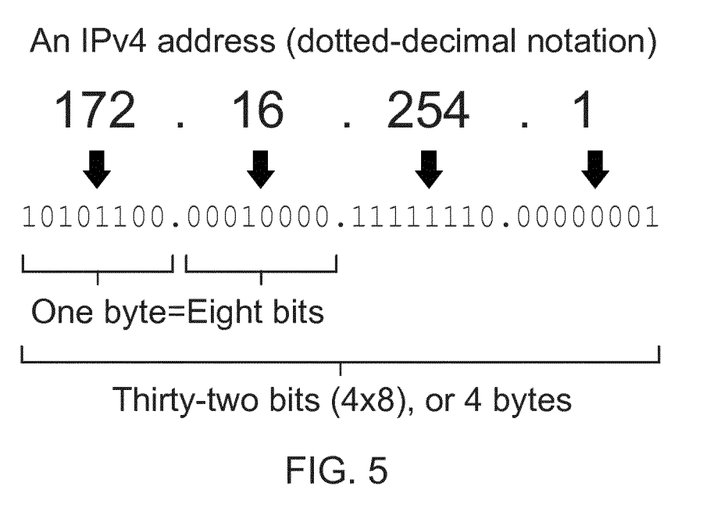
FIG. 5 illustrates an I Pv4 address.

FIG. 5 illustrates an SEM addressing system using IPv4 addressing. Thus regardless of a physical layer utilised an addressing system remains the same. Subsea SEMs are given individual IP address pools for each of their functional cards within a wider IP pool i.e. The AAA.BBB.0.0/16 pool is broken into subsets used as follows: AAA.BBB.1.0/27 is used for SEMI, AAA.BBB.2.0/27 pool is used for SEM2, Etc. AAA.BBB.150.0/27 pool is used for SEM150. The topside source communications will originate from within XXX.YYY.1.0/24 pool.

Figure 6:
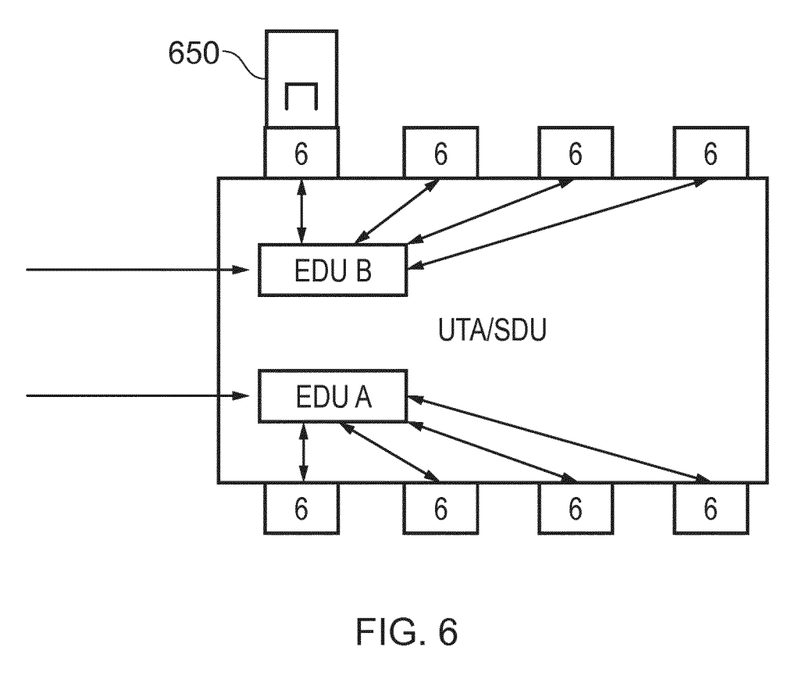
FIG. 6 illustrates wet mate connectors of an SDU.

FIG. 6 helps illustrate the SDU 140 shown in FIG. 3 with the wet mating connectors leading to the flying leads shown interconnected via internal connections to a side A Electrical Distribution Unit (EDU) and a side B EDU. The EDU is a sealed junction box effectively containing splices or electrical connections within a subsea container. FIG. 6 also helps illustrate how during field deployment, when all SCMs/EFLs are not deployed, a parking connector 650 which includes passthrough pins for point-to-point link connection can be used to carry through only two communication wires. Use of an EDU can be a retrievable unit though it will be appreciated by those skilled in the art that an EDU is not always retrievable. Also it may be possible to connect to the back of the wet mate connectors with an appropriate water tight seal and provide the electrical core distribution as shown in FIG. 3.

Certain embodiments of the present invention thus provide a point-to-point communication topology in a subsea network environment which helps optimise availability of communications without deviation from a standard linear layout of UTAs and umbilical's typically required by a subsea SURF provider. By utilising internal cross-strapping of SEMs and ethernet routing a dual ring with two SEMs is provided which forms a ladder topology. While the physical connectivity is an effectively aligned to a typical BUS, a ring can be constructed by looping back point-to-point links from subsea to topside. This increases the number of copper/fibre cores and further improves the band width capabilities and availability without impacting the cost of the initial umbilical significantly. The formed ladder topology helps maximise throughput for all nodes/routers with the longest point-to-point links restricting the speed, rather than a BUS which is limited by the furthest node.

Umbilical's act as low pass filters, the longer the umbilical the slower the throughput negotiated or achieved with the modulation. Having multiple shorter point-to-point steps increases the throughput as the signal is effectively repeated by each router. Therefore offsets between SCMs can be significantly more than typical BUS topology as steps of 35 km/10 mmsq can be achieved between SCMs. Series of point-to-point links removes the need for token exchange or a low layer node addressing system/protocol eating into the possible throughput.

Long offset multidrop systems are also poorly supported from a technology standpoint outside of the subsea sector making the technology costlier to develop with no possibility of import from the wider industrial communications sector. Point-to-point technologies are more widely available and expected to be used more in the future, be it fibre or copper-based solutions.

As a result, if even a single modem fails data can be exchanged through other routes for communicating with the master and further additional SCMs can be connected in the future by breaking the ring subject to increased power demands enabling future flexibility. Power delivery in this topology may continue to be in a BUS arrangement.

Certain embodiments of the present invention thus make use of a point-to-point copper or fibre-based modem in a subsea environment arranged as a physical BUS layout for a production control system. Utilising an internal cross strap provides a ladder topology for communication subsea thus increasing communications availability.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The invention claimed is:

1. A subsea communication network arranged in a topology having a first side and a second side, the subsea communication network comprising:
    two or more Subsea Control Modules (SCMs), each of the two or more SCMs comprising a first side Subsea Electronics Module (SEM) connected to a second side SEM;
    a first side surface modem unit (SMU) and a second side SMU; and
    a first side surface Power Supply Module (PSM) and a second side surface PSM, wherein the first side SEM and the second side SEM are part of respective sets of SEMs that share a common side allocation that is either in the first side or in the second side, and wherein the first side and the second side of the subsea communication network are connected together via a point-to-point communication link.

2. The subsea communication network of claim 1, wherein the first side SEM and the second side SEM are connected to a respective SMU of the first side SMU and the second side SMU, the respective SMU also sharing the common side allocation of the first side or the second side in the topology, via the point-to-point communication link.

3. The communication network of claim 1, wherein the sets of SEMs comprises at least two SEMs in at least one of the sets of SEMs, the at least two SEMs connected to a respective SMU of the first side SMU and the second side SMU, the respective SMU also sharing the common side allocation of the first side or the second side in the topology, via the point-to-point communication link.

4. The subsea communication network of claim 1, wherein the sets of SEMs comprises at least two SEMs in the sets of SEMs, each of the at least two SEMs connected to a respective SMU of the first side SMU and the second side SMU, the respective SMU also sharing the common side allocation of the first side or the second side in the topology, via the point-to-point communication link.

5. The subsea communication network of claim 1, wherein the point-to-point communication link is external to the two or more SCMs, and wherein the first side SEM is connected to the second side SEM via a further point-to-point communication link that is within a respective SCM of the two or more SCMs.

6. A Subsea Control Module (SCM) for a subsea communication network that is arranged in a topology having a first side and a second side, the SCM comprising:
    a rigid housing;
    a first Subsea Electronics Module (SEM) connected to a second SEM in the housing; and
    a plurality of wet mate connector members associated with the housing wherein each of the plurality of wet mate connector members comprises two first connector elements for a first positive line and for a first negative line of a first point-to-point communication link, comprises two second connector elements for a second positive line and for a second negative line of a second point-to-point communication link, and comprises a positive power connecter element for a positive power supply connection and a negative power connection element for a negative power supply connection.

7. The SCM of claim 6, wherein each of the first SEM and the second SEM in the SCM is allocated to a respective one of the first side or the second side of the topology and is connectable via the first or the second point-to-point communication link to a further SEM, in another SCM, that shares a common side allocation of the first side or the second side.

8. The SCM of claim 6, wherein each of the first SEM and the second SEM comprises a plurality of long haul modem elements, and wherein each of the plurality of long haul modem elements have a reach capability in excess of 1 km.

9. The SCM of claim 6, wherein the first SEM is connected to the second SEM, in the housing, via a further point-to-point communication link with transmit and receive capability.

10. A Subsea Distribution Unit (SDU) for a subsea communication network, the SDU comprising:
    a rigid housing;
    a plurality of wet mate connector members associated with the rigid housing, wherein each of the plurality of wet mate connector members comprises two first connector elements for a first positive line and first negative line of a first point-to-point communication link, comprises two second connector elements for a second positive line and a second negative line of a second point-to-point communication link, and comprises a positive power connector element for a positive power supply connection and a negative power connector element for a negative power supply connection; and
    an SDU interface comprising at least one wet mate interface connection.

11. The SDU of claim 10, wherein the wet mate interface connection comprises:
an A side positive power connector element;
an A side negative power connector element;
a B side positive power connector element;
a B side negative power connector element;
two third connector elements comprising a third first side positive line and a third first side negative line of a third point-to-point communication link to be associated with one or more of the plurality of wet mate connector members; and
two fourth connector elements comprising a fourth second side positive line and a fourth second side negative line of a fourth point-to-point communication link to also be associated with one or more of the plurality of wet mate connector members.

12. A method of communicating between nodes in a subsea communication network that has a first side and a second side BUS topology, comprising the steps of:
determining a fault associated with one or more of a plurality of Surface Modem Units (SMUs) or a point-to-point communication link associated with the first side or the second side; and
communicating from the first side or the second side with one or more of the nodes, upon a determined fault and using an opposing side of the first side or the second side and using an internal cross strap communication link between a plurality of Subsea Electronics Modules (SEMs) that is within a Subsea Control Module (SCM), the opposing side being without the determined fault.

13. The method of claim 12, further comprising:
communicating between one of the plurality of SEMs and the SMU via at least one further point-to-point communication link that connects the plurality of SEMs that share, in common, the opposing side that is associated with different SCMs of the subsea communication network.

14. The method of claim 12, wherein the plurality of SEMs and the plurality of SMUs are associated together via a single umbilical cable that provides first power to first ones of the plurality of SEMs of the first side in the subsea communication network, second power to second ones of the plurality of SEMs of the second side in the subsea communication network, first communication, using to at least one of first side digital subscriber line (DSL) point-to-point communication link, between first ones of the plurality of SEMs and first ones of the plurality of SMUs on the first side, and second communication, using at least one of second side DSL point-to-point communication link between second ones of the plurality of SEMs and second ones of the plurality of SMUs on the second side.

15. A subsea well installation comprising:
a Subsea Control Module (SCM) for a subsea communication network arranged in a topology having a first side and a further side and a Subsea Distribution Unit (SDU), the SDU comprising:
a rigid housing;
a plurality of wet mate connector members associated with the rigid housing, wherein each of the plurality of wet mate connector members comprises two first connector elements for a first positive line and first negative line of a first point-to-point communication link, comprises two second connector elements for a second positive line and a second negative line of a second point-to-point communication link, and comprises a positive power connector element for a positive power supply connection and a negative power connector element for a negative power supply connection; and
an SDU interface comprising at least one wet mate interface connection.

* * * * *